United States Patent
Samra

(10) Patent No.: US 7,653,904 B2
(45) Date of Patent: Jan. 26, 2010

(54) SYSTEM FOR FORMING A CRITICAL UPDATE LOOP TO CONTINUOUSLY RELOAD ACTIVE THREAD STATE FROM A REGISTER STORING THREAD STATE UNTIL ANOTHER ACTIVE THREAD IS DETECTED

(75) Inventor: Nicholas G. Samra, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1336 days.

(21) Appl. No.: 10/672,150

(22) Filed: Sep. 26, 2003

(65) Prior Publication Data

US 2005/0097551 A1 May 5, 2005

(51) Int. Cl.
G06F 9/46 (2006.01)
G06F 9/00 (2006.01)

(52) U.S. Cl. .................. 718/100; 718/108; 712/233; 712/241

(58) Field of Classification Search .......... 718/1, 718/100, 102, 103, 104, 105, 106, 107, 108, 718/101; 712/228, 221, 233, 241
See application file for complete search history.

(56) References Cited

U.S. PATENT DOCUMENTS

| | | | | |
|---|---|---|---|---|
| 5,835,705 A | * | 11/1998 | Larsen et al. | 714/47 |
| 5,907,702 A | * | 5/1999 | Flynn et al. | 718/108 |
| 6,341,347 B1 | * | 1/2002 | Joy et al. | 712/228 |
| 6,357,016 B1 | * | 3/2002 | Rodgers et al. | 713/601 |
| 6,438,671 B1 | * | 8/2002 | Doing et al. | 711/173 |
| 6,629,236 B1 | * | 9/2003 | Aipperspach et al. | 712/228 |
| 6,965,982 B2 | * | 11/2005 | Nemawarkar | 712/207 |
| 7,080,236 B2 | | 7/2006 | Jourdan | |
| 7,360,064 B1 | * | 4/2008 | Steiss et al. | 712/219 |

OTHER PUBLICATIONS

U.S. Appl. No. 10/609,264, filed Dec. 30, 2004, Samra.

* cited by examiner

*Primary Examiner*—Meng-Ai An
*Assistant Examiner*—Abdullah Al Kawsar
(74) *Attorney, Agent, or Firm*—Blakely, Sokoloff, Taylor & Zafman LLP

(57) ABSTRACT

A method, apparatus, and system are provided for a multi-threaded virtual state mechanism. According to one embodiment, active thread state of a first active thread is received using a virtual state mechanism, and virtual thread state is generated in accordance with the active thread state of the first active thread, and the virtual thread state corresponding to the first active thread is forwarded to state update logic.

9 Claims, 7 Drawing Sheets

SYSTEM FOR FORMING A CRITICAL UPDATE LOOP TO CONTINUOUSLY RELOAD ACTIVE THREAD STATE FROM A REGISTER STORING THREAD STATE UNTIL ANOTHER ACTIVE THREAD IS DETECTED

BACKGROUND OF THE INVENTION

1. Field of the Invention

This invention generally relates to processors and more particularly, to using multi-threaded virtual state mechanism in multi-threaded processors.

2. Description of Related Art

Typically, a hyperthreaded or multi-threaded processor is capable of processing multiple instruction sequences concurrently. A primary motivating factor driving execution of multiple instruction streams within a single processor is the resulting improvement in processor utilization. Multi-threaded processors allow multiple instruction streams to execute concurrently in different execution resources in an attempt to better utilize those resources. Furthermore, multi-threaded processors can be used for programs that encounter high latency delays or which often wait for events to occur.

Typically, although two or more threads may executed concurrently on the same hardware, each thread maintains its own architectural state, and the state is referenced by the executing hardware depending on which thread is active at that particular time in a given pipestage having a latch and a multiplexer, commonly referred to as the "latch and mux" paradigm or mechanism. Using the conventional latch and mux paradigm, the hardware for a single-threaded processor may be expanded to handle two or more threads by adding latches for the state of the second thread along with a multiplexer to select which thread's state is needed to be accessed in any given cycle. However, the conventional latch and mux paradigm may be fairly complex and is often the source of timing problems in critical speedpaths on the processor. For example, timing problems can arise with the conventional latch and mux mechanism in sections of logic that contain tight feedback loops which continually update the architectural state based on the previous value of that state. The problems can be further compounded when this architectural state has the need to be restored due to, for example, misspeculation, such as a branch misprediction.

FIG. 1 is a block diagram illustrating a conventional prior art multi-threading functionality. As illustrated, a multi-threaded processor 100 may include multiple threads, such as thread 0 102, thread 1 104, thread 2 106, and thread 3 108. A current thread multiplexer (CT multiplexer) 110 may be used to detect which thread of the threads 102-108 is active in a particular state of the pipeline. Typically, the size of the CT multiplexer 110 may be directly proportional to the number of threads, for example, as illustrated here, four threads 0-3 102-108 may require a 4:1 CT multiplexer 110.

Using stack pointer logic as an example, although the stack itself and the update process to update the top-of-stack may be shared by all threads 0-3 102-108, the stack pointer may still have a different and separate value corresponding to the active thread, such as thread 0 102, of the threads 0-3 102-108. The CT multiplexer 110 may be used to choose the active thread 0 102 and forward the information regarding the active thread 0 102 to logic to process register stack reference 112 and logic to update top-of-stack (TOS) 114. The result of the logic to update TOS 114 may then be looped back as a feed back loop 116 to update the thread that was active by writing the result into the thread 0 102 TOS. Typically, thread TOS may be updated using the logic to update TOS 114 to reflect the TOS changes indicated by instructions as pushes and pops. The updating of the thread TOS may then be used by the next group of instructions to be processed at the next cycle. However, such TOS updates may have to happen every cycle requiring a 1-cycle feedback loop 116 to update the thread TOS, and due to the limitations of the clock speed and processor logic, the CT multiplexer 110 may be required to perform the selection process of the active thread of the threads 0-3 102-108 per cycle. Requiring such a selection process task from the CT multiplexer 110 for every cycle before forwarding active thread state information to logic 112-114 may significantly slow down the processor 100.

Furthermore, the update logic, such as logic to update TOS 114, may have to be expanded to update and/or access the TOS of any of the threads 0-3 102-108, depending on which thread of the threads 0-3 102-108 was active in a given cycle. Each thread 0-3 102-108 may also require logic to provide for state restoration (SR) 118-124 using SR multiplexers 126-132, should the TOS be corrupted due to an occurrence or event, such as a mispredicted branch. Conventional methods, apparatus, and systems require all components, such as the CT multiplexer 110 and SR multiplexers 118-124, to remain a part of the critical loop, such as the feedback loop 116, resulting in further lowering of the machine frequency.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
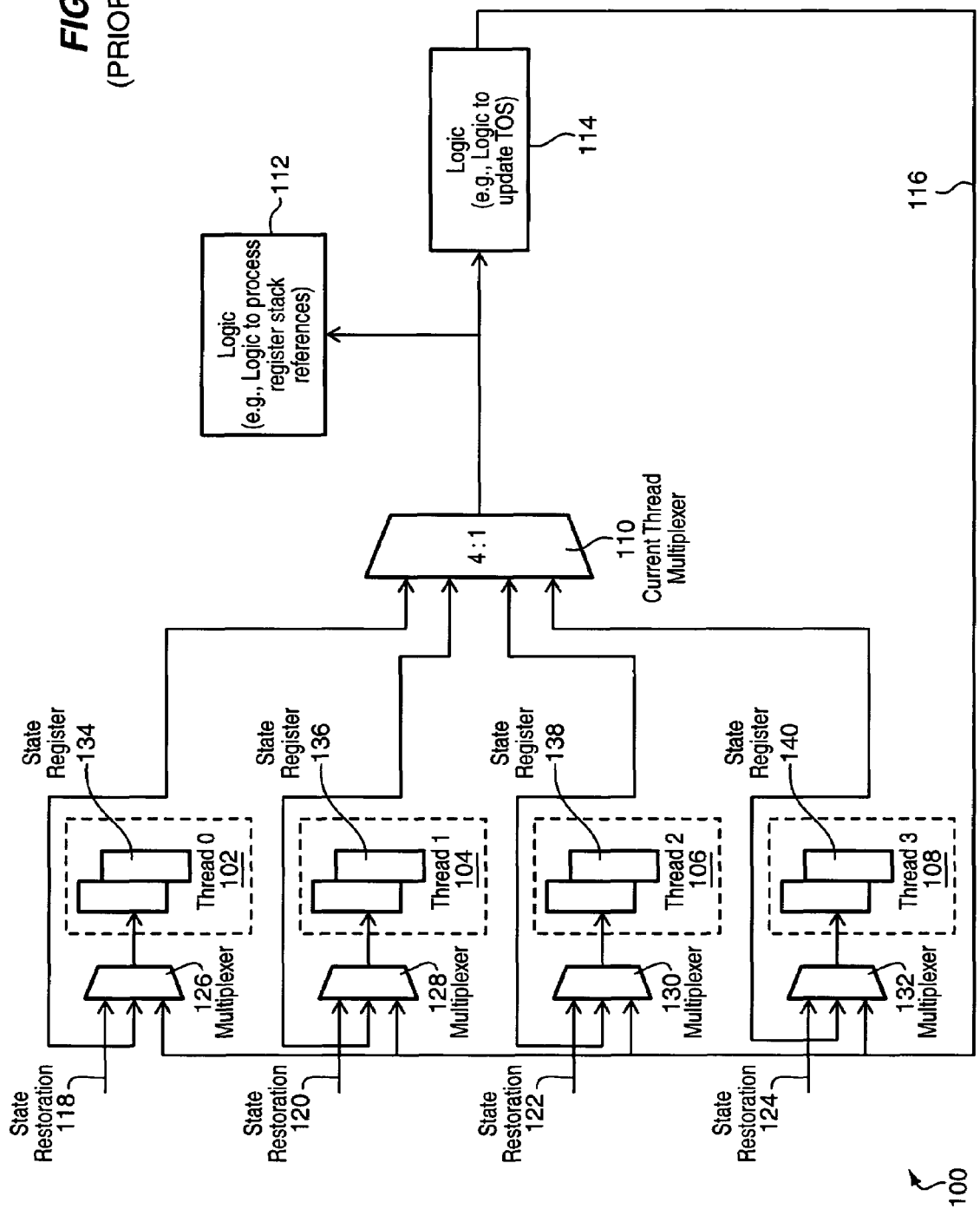
FIG. 1 is a block diagram illustrating a conventional prior art multi-threading functionality.

A method and apparatus are described for using a virtual state mechanism in multi-threaded processors. Various embodiments of the present invention provide for using virtual state mechanism to increase frequency in multi-threaded processors, while maintaining their multi-threaded functionality.

A system, apparatus, and method are provided for reducing gates and gate delays in multi-threaded processor to increase the processor frequency using virtual state mechanism. A typical multi-threaded processor may include multiple threads or logical processors sharing the same resource. According to one embodiment, the virtual state mechanism may include a multiplexer and a latch to store any machine state of the multi-threaded processor that is updated every cycle. For example, according to one embodiment, the virtual state mechanism may include a virtual state reload (VSR) multiplexer and a virtual thread (VT) latch or flop or state register (state register) to reduce the number of gates in logic that contains a critical feedback loop, such as logic to update top-of-stack (TOS). Stated differently, according to one embodiment, using the virtual state mechanism, many of the components, such as registers and multiplexers, associated with threads and, in particular, associated with an active thread, may be isolated and removed from the critical path or loop, such as a feedback loop, between the active thread and any state update logic. According to one embodiment, by reducing the critical path, the number of gate delays required to implement, for example, a single-cycle loop in a multi-threaded processor may be significantly reduced and the frequency of the processor may be significantly increased.

According to one embodiment, active thread state of an active thread may be received by the VSR multiplexer of the virtual state mechanism from a next thread (NT) multiplexer. The VSR multiplexer may forward the information to the VT state register of the virtual state mechanism. According to one embodiment, virtual thread state corresponding to the active thread may be generated using the actual active thread state, and the virtual thread state may be maintained at the VT state register. According to one embodiment, the virtual thread state corresponding to the active thread may be forwarded to any state update logic, such as the logic to update TOS.

According to one embodiment, a typical feedback loop between the state update logic and various threads may be reduced to a feedback loop between the state update logic and the virtual state mechanism by, for example, reloading the virtual thread state using the VSR multiplexer, and maintaining the virtual thread state until a new active thread is detected. According to one embodiment, if a new active thread is detected, the actual active thread state corresponding to the new active thread may be received by the VSR multiplexer from the NT multiplexer. Using the new actual active thread state, according to one embodiment, the current virtual thread state may be updated to a new virtual thread state. The new virtual thread state may be maintained, and then forwarded to the state update logic, and reloaded using the VSR multiplexer until another new active thread is detected. According to one embodiment, the reloading of the virtual state thread may also be interrupted if an uncommon event, such as a branch misprediction, is detected and in such a case, state restoration may be performed to the particular thread needing state restoration (e.g., to the thread TOS) using a state restoration multiplexer associated with the particular thread.

According to one embodiment, any state registers and multiplexers, such as state restoration multiplexers, corresponding to the various threads of the multi-threaded processor may be taken out of the critical path to reduce the critical path to between the virtual state mechanism and the state update logic. According to one embodiment, the next thread (NT) multiplexer may also be taken out of the critical loop and used when a new active thread is detected and/or when an uncommon event is detected. Although, the NT multiplexer may be expanded (e.g., to 2:1, 4:1, or 8:1) directly proportional to the number of threads, according to one embodiment, the VSR multiplexer may remain a 2:1 multiplexer. According to one embodiment, not only the VSR multiplexer may remain a 2:1 multiplexer, as it may receive an input from the NT multiplexer and the a feedback input from the state update logic as part of the feedback loop, but also the NT multiplexer may be removed from the critical path, such as the feedback loop, as discussed above. Such reduction of the critical path may result in a significant decrease of hardware and gate delays in multi-threaded processors, and a significant increase in the frequency of the processors. According to one embodiment, virtual state mechanism may be implemented in any number of threads of multi-threaded processors, while letting other threads function as usual. These and/or other embodiments of the present invention may relatively improve the overall machine frequency.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various steps. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
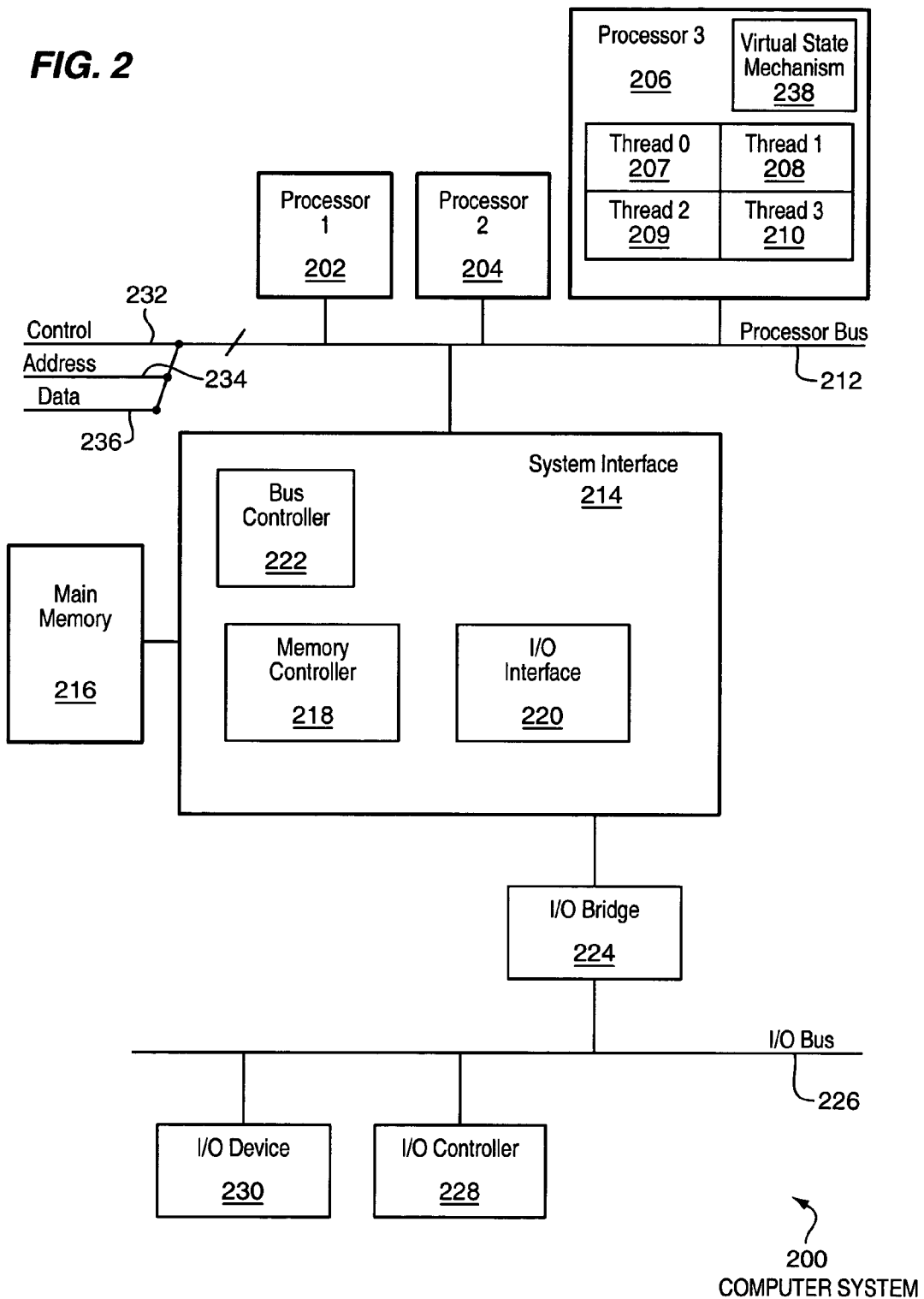
FIG. 2 is a flow diagram illustrating an embodiment of a computer system.

FIG. 2 is a block diagram illustrating an embodiment of a computer system. The computer system (system) includes one or more processors 202-206, including hyperthreaded or multi-threaded processors. A typical multi-threaded processor may include multiple threads or logical processors, such as threads 207-210, as illustrated with respect to processor 206. A multi-threaded processor, such as processor 206, may be capable of processing multiple instruction sequences concurrently using its multiple threads 207-210. Processors 202-206 may also include one or more internal caches (not shown) and a bus controller (not shown) to direct interaction with the processor bus 212. Furthermore, processor 206 may also include a virtual state mechanism 238 to be described later with respect to FIG. 4.

Processor bus 212, also known as the host bus or the front side bus, may be used to couple the multi-threaded processors 202-206 with the system interface 214. Processor bus 212 may include a control bus 232, an address bus 234, and a data bus 236. The control bus 232, the address bus 234, and the data bus 236 may be multidrop bi-directional buses, e.g., connected to three or more bus agents, as opposed to a point-to-point bus, which may be connected only between two bus agents.

System interface 214 (or chipset) may be connected to the processor bus 212 to interface other components of the system 200 with the processors 202-206. For example, system interface 214 may includes a memory controller 218 for interfacing a main memory 216 with the processors 202-206 via the processor bus 212. The main memory 216 typically includes one or more memory cards and a control circuit (not shown). System interface 214 may also include an input/output (I/O) interface 220 to interface one or more I/O bridges or I/O devices. For example, as illustrated, the I/O interface 220 may interface an I/O bridge 224 with the processor bus 212. I/O bridge 224 may operate as a bus bridge to interface between the system interface 214 and an I/O bus 226. One or more I/O controllers and/or I/O devices may be connected with the I/O bus 226, such as I/O controller 228 and 110 device 230, as illustrated. I/O bus 226 may include a Peripheral Component Interconnect (PCI) bus or other type of 110 bus.

System 200 may include a dynamic storage device, referred to as main memory 216, or a random access memory (RAM) or other coupled to the processor bus 212 for storing information and instructions to be executed by the processors 202-206. Main memory 216 also may be used for storing temporary variables or other intermediate information during execution of instructions by the processors 202-206. System 200 may include a read only memory (ROM) and/or other static storage device coupled to the processor bus 212 for storing static information and instructions for processor 210.

Main memory 216 or dynamic storage device may include magnetic disk or optical disc for storing information and instructions. I/O device 230 may include a display device (not shown), such as a cathode ray tube (CRT) or Liquid Crystal Display (LCD), for displaying information to an end user. For example, graphical and/or textual indications of installation status, time remaining in the trial period, and other information may be presented to the prospective purchaser on the display device. I/O device 230 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

System 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as Field Programmable Gate Arrays (FPGAs), TTL logic, or Application Specific Integrated Circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 3:
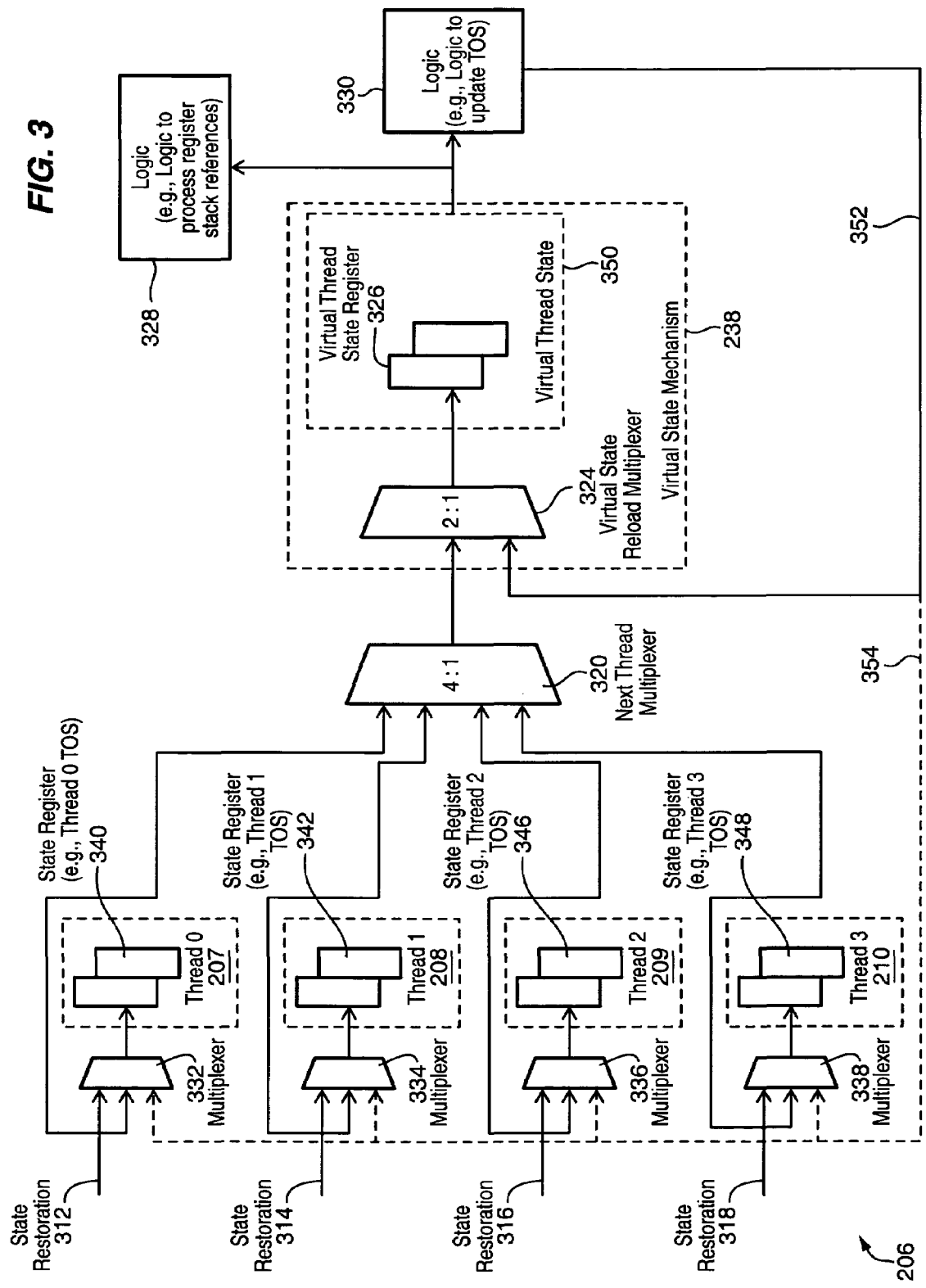
FIG. 3 is a block diagram illustrating an embodiment of a multi-threaded virtual state mechanism.

FIG. 3 is a block diagram illustrating an embodiment of multi-threading virtual state mechanism. As illustrated, a typical hyperthreaded or multi-threaded processor (processor) 206 may include multiple threads or logical processors, such as threads 0-3 207-210. It is contemplated that a multi-threaded processor, such as processor 206, may have any number of threads. A thread, according to one embodiment, may represent an instruction stream and thus, multiple threads 0-3 207-210 may represent multiple instruction streams running on one processor 206. Typically, the threads 0-3 207-210 give the appearance of separate physical processors sharing the same resources. However, to save additional hardware, the threads 0-3 207-210 may take turns, for example, in any state update logic, such as the stack pointer logic or logic to update top-of-stack (TOS) 330, as illustrated.

Using the logic to update TOS 330 as an example of a state update logic, although the logic to update TOS 330 itself may be shared between the threads 0-3 207-210, the architectural state of the TOS may need to be set for each of the threads 0-3 207-210 individually, as the state of the stack may be different for each of the threads 0-3 207-210. The state of the stack may be different because, for example, the stack pointer of the stack may have a different value for each of the threads 0-3 207-210 of the processor 206. Stated differently, although the stack itself and the update process for TOS using the logic to update TOS 330 may be shared, the value of the stack pointer may be separate and reset corresponding to and depending on the state of the active thread of the threads 0-3 207-210 at the time.

Each of the threads 0-3 207-210 may be coupled with a corresponding state restoration (SR) multiplexer 312-318. The threads 0-3 207-210 may also be coupled with a single multiplexer, known as the next thread (NT) multiplexer 320. The NT multiplexer 320 may be used to receive, detect, and in some cases, decide, and forward information regarding the actual active thread state of the active thread, such as thread 0 207. For example, the NT multiplexer 320 may detect which of the threads 0-3 207-210 is active and forward the active thread state of the active thread to the next component in line. The size of the NT multiplexer 320 may vary, such as from 2:1 to 4:1 to 8:1, depending on the number of threads, such as threads 0-3 207-210, of the processor 206. Typically, the expansion of the NT multiplexer 320 may be directly proportional to the number of threads of the processor 206. As illustrated, the NT multiplexer 320 may be a 4:1 multiplexer directly proportional to the four threads 0-3 207-210 of the processor 206.

According to one embodiment, a virtual state mechanism 238 may be used to provide a virtual thread state 350 of the actual active thread state of the active thread (e.g., thread 0 207) of the threads 0-3 207-210. Stated differently, the virtual state mechanism 238 may generate, update, and maintain a virtual thread state 350 representing the actual active thread state of the active thread 0 207.

According to one embodiment, the virtual state mechanism 238 may include a multiplexer and a latch to perform any machine state of the processor that is updated using cycles. For example, according to one embodiment, the virtual state mechanism 238 may include a virtual state reload (VSR) multiplexer 324 and a virtual thread (VT) latch or flop or state register (state register) 326 to reduce the number of loops between, for example, a next thread (NT) multiplexer 320 and state update logic (e.g., logic to update TOS 330). Stated differently, according to one embodiment, using the virtual state mechanism 238, many of the components including various registers (e.g., state registers 340-348) and multiplexers (e.g., NT multiplexer 320 and state restoration multiplexers 332-338) associated with threads 0-3 207-210 and in particular, associated with an active thread (e.g., thread 0 207) may be isolated and removed from the critical path or loop, such as a feedback loop 352. According to one embodiment, by reducing the feedback loop 352 to between the state update logic (e.g., logic to update TOS 330) and the virtual state mechanism 238, the number of gates and gate delays required to implement, for example, a single-cycle loop in a multi-threaded processor 206 may be significantly reduced and the frequency of the processor 206 may be significantly increased.

According to one embodiment, for example, active thread state of an active thread (e.g., thread 0 207) may be received by the VSR multiplexer 324 of the virtual state mechanism 238 via the NT multiplexer 320. The VSR multiplexer 324 may forward the information relating to the actual active state of the active thread 0 207 to the VT state register 326. According to one embodiment, virtual thread state 350 corresponding to the active thread 0 207 may be generated using the active thread state. The virtual thread sate 350 may then be maintained at the VT state register 326. According to one embodiment, the virtual thread state 350 corresponding to the actual active thread may be forwarded to the state update logic, such as the logic to update TOS 330. The virtual thread state 350 may also be forward to any other logic, such as the logic to process register stack references 328.

According to one embodiment, the typical feedback loop 354 between the state update logic 330 and the threads 0-3 207-210 may be reduced to the feedback loop 352 between the state update logic 330 and the virtual state mechanism 238 by, for example, continually reloading the virtual thread state 350 using the VSR multiplexer 324, and maintaining the virtual thread state 350 until a new active thread (e.g., thread 1 208) is detected. According to one embodiment, if a new active thread, thread 1 208, is detected, the actual active thread state corresponding to the new active thread 1 208 may be received from the NT multiplexer 320 by the VSR multiplexer 324. Using the new active thread state, according to one embodiment, the virtual thread state 350 may be updated and then forward to the state update logic (e.g., logic to update TOS 330 and the logic to process register stack references 328). According to one embodiment, the now update virtual thread state 350 may be maintained at the VT state register 326 and the reloaded into using the VSR multiplexer 324 until another new active thread, such as any of threads 0 207, thread 2 209, and thread 3 210 is detected. According to one embodiment, the reloading of the virtual thread state 350 may also be interrupted if an uncommon event, such as a branch misprediction, is detected and in such a case, state restoration, such as state restoration 314, may be performed to a particular active thread, such as the active thread 1 208, needing state restoration (e.g., to the thread 1 208 TOS) using a state restoration multiplexer 324 associated with the active thread 1 208.

According to one embodiment, SR multiplexers 332-338 and the NT multiplexer 320 may be used when a new active thread is detected and/or when an uncommon event is detected. Stated differently, critical path or feedback loop 354 may be rare and taken when a new active thread or an uncommon event is detected. Although, the NT multiplexer 320 may be expanded (e.g., to 2:1, 4:1, or 8:1) directly proportional to the number of threads 0-3 207-210, according to one embodiment, the VSR multiplexer 324 may remain a 2:1 multiplexer. According to one embodiment, the VSR multiplexer 324 may remain a 2:1 multiplexer, as it may receive an input from the NT multiplexer 320 and a feedback loop input from the state update logic 330 as part of the feedback loop 352. According to one embodiment, virtual state mechanism 238 may be implemented in any certain number of threads (e.g., threads 0-1 207-208) of the processor 206, while letting other threads (e.g., threads 2-3 209-210) function as usual.

According to one embodiment, the thread selection process for each cycle may be eliminated and the current thread (CT) multiplexer (e.g., CT multiplexer 110 of FIG. 1) may be replaced with the NT multiplexer 320. For example, using thread 0 207 as the active thread, having and using the virtual state mechanism 238 may provide for a multiplexer 324-state register 326-logic 330 (M-R-L) combination, as opposed to in FIG. 1, using thread 0 102 as the active thread, the conventional mechanism provides for a multiplexer 126-state register 134-multiplexer 110-logic 114 (M-R-M-L) combination. According to one embodiment, having the virtual state mechanism 238 may result in reducing of hardware, gates, and gate delays, and increasing of processor frequency.

Furthermore, according to one embodiment, any rare updates (e.g., updates to the TOS machine state or state restoration) may be done to the state registers 340-348 independent of the feedback loop 352. Although components relating to state restoration 312-318, such as the ST multiplexers 332-338, and state registers 340-348 may remain outside the feedback loop 352, the natural machine state of the threads 0-3 207-210 may still be provided, maintained, and updated. For example, with regard to thread 0 207, state restoration 312, multiplexer 332, state register 340, NT multiplexer 320, and the feedback loop 354 from logic 330 may still be provided for use, as necessitated. As stated on several occasions in this disclosure, the logic to update TOS 330 and the logic to process register stack references 328 are provided as examples, and the virtual machine mechanism 238 may be used with any other machine state or more particularly, with any other machine state update logic.

Figure 4:
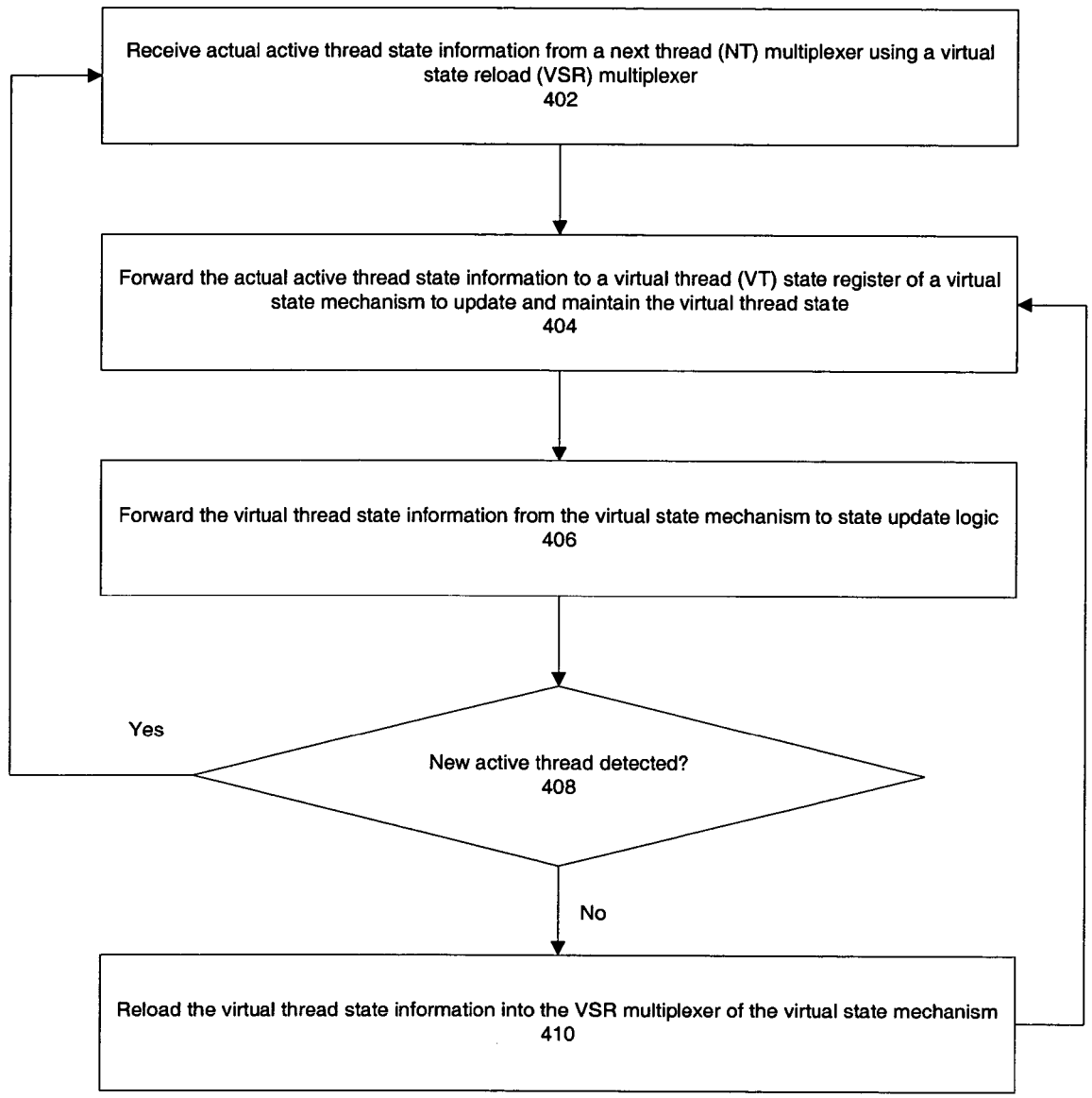
FIG. 4 is a flow diagram illustrating an embodiment of a multi-threaded virtual state mechanism process.

FIG. 4 is a flow diagram illustrating an embodiment of a virtual state mechanism process. Typically, a hyperthreaded or multi-threaded processor may include multiple threads or logical processors. A thread, according to one embodiment, may represent an instruction stream and thus, multiple threads may represent multiple instruction streams running on one multi-threaded processor. Typically, multiple threads give the appearance of separate physical processors sharing the same resources. However, to save additional hardware, the threads typically take turns when, for example, using state update logic (e.g., stack pointer logic or logic to update top-of-stack (TOS)). Although the logic to update TOS may be shared between the threads, the state of the stack may be different for each of the threads because, for example, the stack pointer may have a different value for each of the threads. Stated differently, although the stack itself and the update process for TOS may be shared, the value of the stack pointer may be separate and reset corresponding to and depending on the thread being active at the time.

Using an embodiment of a virtual state mechanism, information regarding actual active thread state of an active thread may be received by a virtual state reload (VSR) multiplexer from a next thread (NT) multiplexer at processing block 402. According to one embodiment, the actual active thread state information may then be forwarded to a virtual thread (VT) latch or a flop or a state register (state register) of the virtual state mechanism at processing block 404. At the VT state register, a virtual thread or virtual thread state may be generated, updated, and maintained. According to one embodiment, the virtual state mechanism may comprises the VSR multiplexer for not only receiving the actual active thread state from the NT multiplexer, but also for reloading the virtual thread state into the virtual state mechanism for, for example, as long as the current active thread remains active. Stated differently, according to one embodiment, the virtual thread state corresponding to the actual active thread state of the active thread may be maintained at the virtual state mechanism using the VSR multiplexer and the VT state register and thus, eliminating the need for the NT multiplexer to perform the selection process and/or to stay in the critical path or loop, such as the feedback loop. Furthermore, as the NT multiplexer may be expanded (such as from 2:1 to 4:1 to 8:1) directly proportional to the number to the number of threads in the processor, according to one embodiment, the VSR multiplexer may remain a 2:1 multiplexer regardless of the number of threads, as the VSR multiplexer may have two inputs, including an input from the NT multiplexer and a feedback loop input.

According to one embodiment, information relating to the virtual thread state may then be forwarded to any state update logic of the processor at processing block 406. An example of the state update logic may include the logic to update TOS and the logic to process register stack references, as described with reference to FIG. 3. Typically, the information from the logic to update TOS may then be used via the conventional feedback loop to update TOS of the active thread. According to one embodiment, the conventional loop from the logic to update TOS to the active thread may be reduced to a feedback loop between the state update logic (e.g., logic to update TOS) and the virtual state mechanism.

According to one embodiment, using the virtual state mechanism, at decision block 408, whether a new thread, such as thread 1 (other than the current active thread, such as thread 0), has become active is determined. According to one embodiment, if the same thread (e.g., thread 0) has remained active and no new thread (e.g., thread 1) has become active, the virtual thread state corresponding to the active thread (e.g., thread 0) may be reloaded using the VSR multiplexer at processing block 410. Stated differently, the virtual thread state of thread 0, the still active thread, may be maintained at the virtual state mechanism. Such maintenance of the virtual thread state of thread 0 may eliminate various components, including threads 0-3, multiplexers, registers, etc., from the feedback loop, reducing gates and gate delays and increasing processor frequency. According to one embodiment, if a new thread (e.g., thread 1) has become active, the process may return to and continue at the processing block 402.

Figure 5:
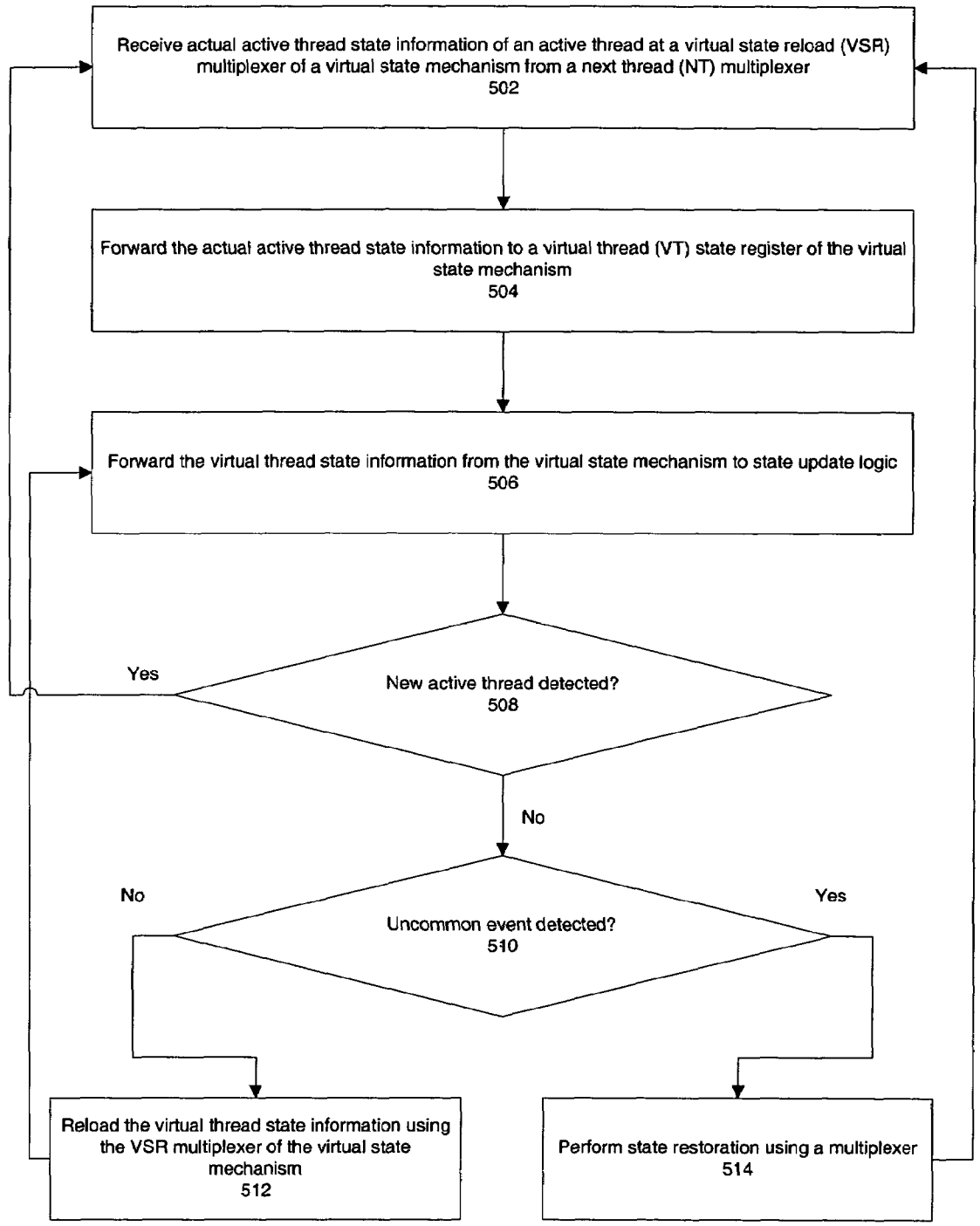
FIG. 5 is a flow diagram illustrating an embodiment of a multi-threaded virtual state mechanism process.

FIG. 5 is a flow diagram illustrating an embodiment of a virtual state mechanism process. According to one embodiment, as described with respect to FIG. 4, actual active thread state information, including actual active thread state, corresponding to an active thread of multiple threads of a multi-threaded processor may be received by a virtual state reload (VSR) multiplexer of a virtual state mechanism from a next thread (NT) multiplexer at processing block 502. At processing block 504, according to one embodiment, the actual active thread state may be forwarded to a virtual thread (VT) latch or a flop or a state register (state register) of the virtual state mechanism. According to one embodiment, a virtual thread state corresponding to the actual active thread state of the active thread may be generated, updated, and maintained, using the VT state register at the virtual state mechanism. At processing block 506, information relating to the virtual thread state, including the virtual thread state, may be forwarded to state update logic (e.g., logic to update top-of-stack (TOS)). Using a stack pointer example, the information may also be forward to logic to process register stack references. According to one embodiment, the virtual state mechanism may be used with any state update logic, such as the logic to update TOS and the logic to process register stack references used here as examples.

At decision block 508, whether a new active thread is detected may be determined. If a new active thread (e.g., thread 1) is detected as active and the currently active thread (e.g., thread 0) becomes inactive, the process returns to the processing block 502 with receiving of the actual active thread state corresponding to the new active thread (e.g., thread 1). If the currently active thread (e.g., thread 0) remains active, and no new active thread is detected, at decision block 510, uncommon events or uncommon updates (e.g., branch misprediction) to TOS machine state may be determined. If there is an uncommon event detected, according to one embodiment, state restoration may be performed to the threads (e.g., threads 0-3 of the processor, assuming the processor has four threads) using a state restoration multiplexer at processing block 514. The process may then continue at processing block 502. If no uncommon event is detected, state restoration may not be needed and the virtual thread state of the currently active thread (e.g., thread 0) may be reloaded using the VSR multiplexer of the virtual state mechanism at processing block 512. The process may then continue at processing block 506 with forwarding of the virtual thread state information to any state update logic. According to one embodiment, the need for a conventional state restoration input for every cycle may be eliminated and thus, the threads (e.g., threads 0-3), multiplexers, and registers used for state restoration may be removed from the feedback loop.

Figure 6:
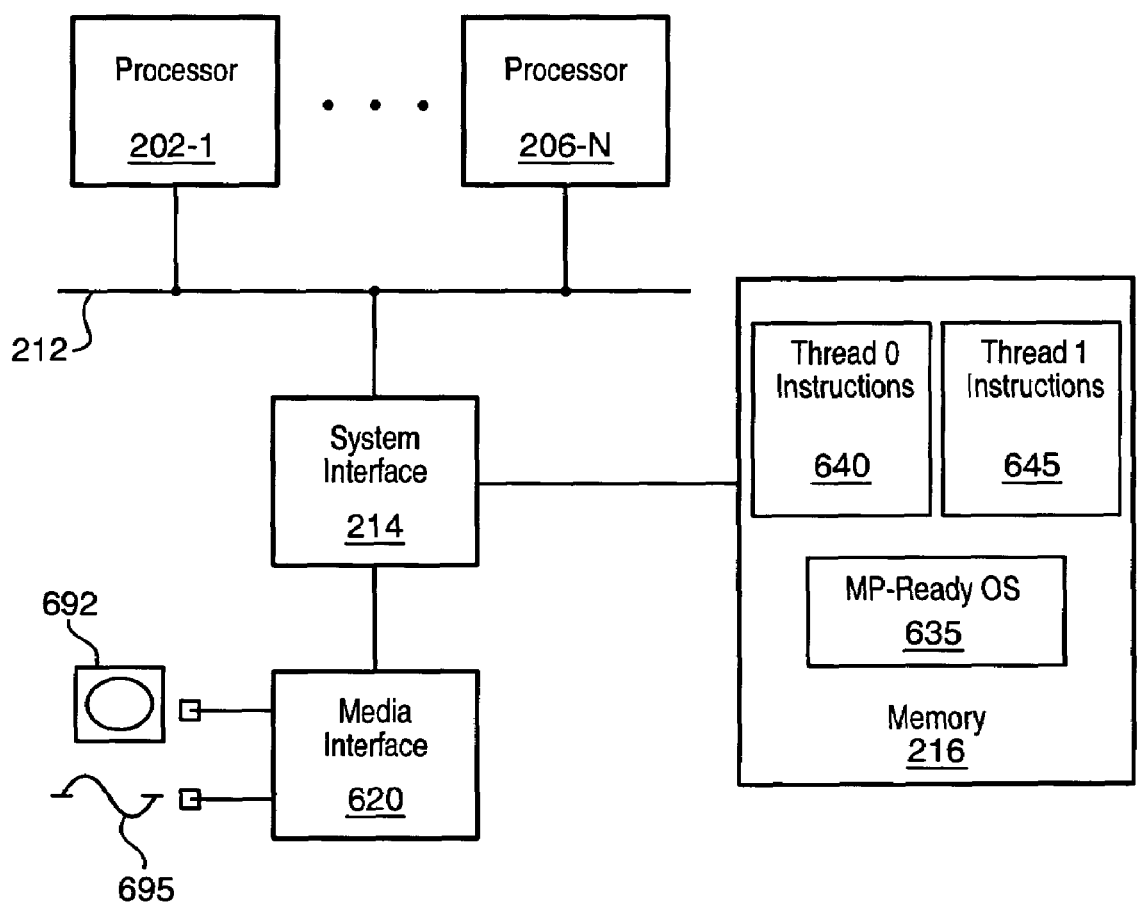
FIG. 6 is a block diagram illustrating an embodiment of a system.

FIG. 6 is a block diagram illustrating an embodiment of a system. According to one embodiment, as illustrated, the system includes a set of N multi-threaded processors, processors 202-1 through 206-N. The multi-threaded processors 202-1-206-N are coupled with a processor bus 212. According to another embodiment, a single processor or a mix of multi-threaded processors and single-threaded processors may be used. Furthermore, other known or otherwise available system arrangements may be used. For example, the processors 202-1-206-N may be connected in a point-to-point fashion, and parts such as the memory interface may be integrated into each processor 202-1-206-N.

According to one embodiment, a system interface 214 coupled with the bus 212 is coupled with a memory 216 and a media interface 620. The memory 216 may include a multi-processing ready operating system 635, and instructions for a first thread (e.g., thread 0) 640 and instructions for a second thread (e.g., thread 1) 645.

According to one embodiment, the appropriate software to perform various functions or embodiments may be provided in any of a variety of machine-readable mediums. According to one embodiment, the media interface 620 may provide an interface to such software.

According to one embodiment, the media interface 620 may be an interface to a storage medium 692 (e.g., a disk drive, an optical drive, a tape drive, a volatile memory, a non-volatile memory, or the like) or to a transmission medium 695 (e.g., a network interface or other digital or analog communications interface). The media interface 620 may read software routines from a medium (e.g., storage medium 692 or transmission medium 695). Machine-readable mediums may refer to any mediums that may store, at least temporarily, information for reading by a machine interface. This may include signal transmissions (via wire, optics, or air as the medium) and/or physical storage media 692 such as various types of disk and memory storage devices.

Figure 7:
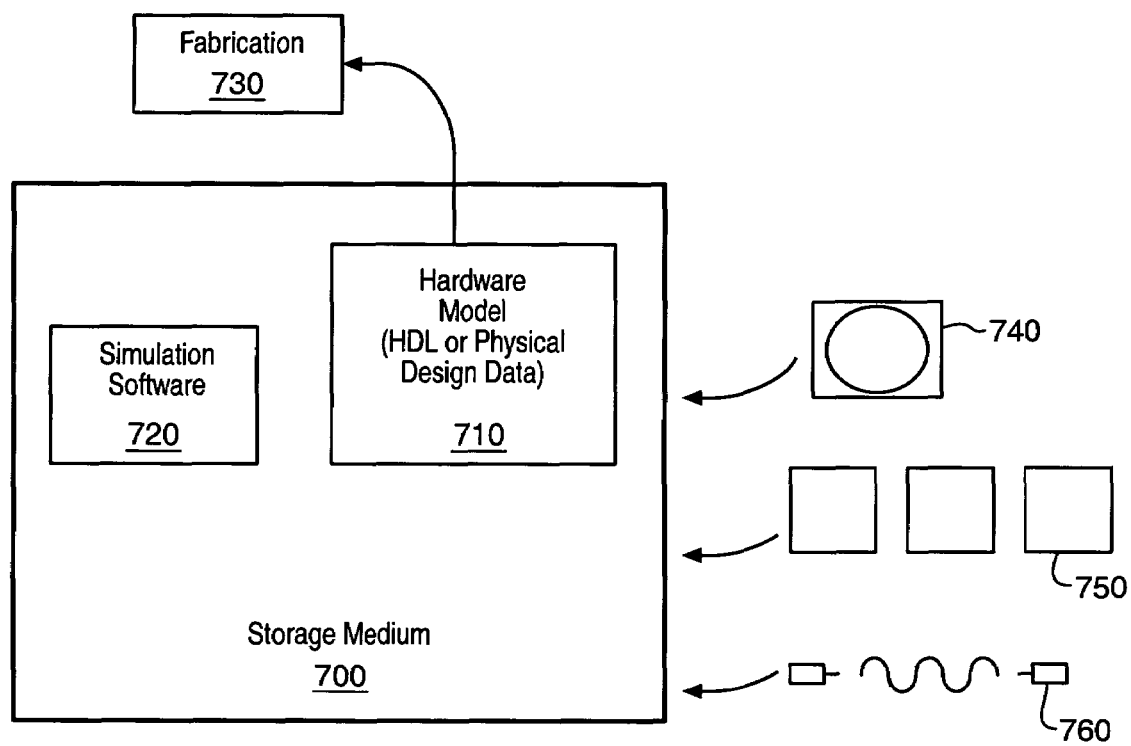
FIG. 7 is a block diagram illustrating an embodiment of various design representations or formats for simulation, emulation, and fabrication of a design.

FIG. 7 is a block diagram illustrating an embodiment of various design representations or formats for simulation, emulation, and fabrication of a design. Data representing a design may represent the design in a number of manners. First, as is useful in simulations, the hardware may be represented using a hardware description language or another functional description language which essentially may provide a computerized model of how the designed hardware is expected to perform. The hardware model 710 may be stored in a storage medium 700, such as computer memory 216 of FIGS. 2 and 6, so that the model may be simulated using simulation software 720 that may apply a particular test suite 730 to the hardware model 710 to determine whether it is performing its intended function. According to one embodiment, the simulation software 720 may not be recorded, captured, or contained in the medium.

According to one embodiment, a circuit level model with logic and/or transistor gates may be produced at some stages of the design process. Such model may be similarly simulated, sometimes by dedicated hardware simulators that form the model using programmable logic. This type of simulation, taken a degree further, may be an emulation technique. According to one embodiment, re-configurable hardware may involve a machine-readable medium storing a model employing the disclosed techniques.

Furthermore, according to one embodiment, most designs, at some stage, may reach a level of data representing the physical placement of various devices in the hardware model. Where conventional semiconductor fabrication techniques may be used, the data representing the hardware model may be the data specifying the presence or absence of various features on different mask layers for masks used to produce the integrated circuit. This data representing the integrated circuit may have the techniques disclosed in that the circuitry or logic in the data can be simulated or fabricated to perform these techniques.

According to one embodiment, the data may be stored in any form of a computer-readable medium. An optical or electrical wave 760 modulated or otherwise generated to transmit such information, a memory 750, or a magnetic or optical storage 740 such as a disc may represent the medium. The set of bits describing the design or the particular part of the design may represent an article that may be sold in and of itself or used by others for further design or fabrication.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A processor comprising:
 a virtual state mechanism to form a critical update loop that does not include state update logic, the critical update loop being formed each time an actual active thread state of a thread of a plurality of threads is detected, the critical update loop being formed between a virtual state reload multiplexer and a virtual thread state structure, the virtual state mechanism including the virtual state reload multiplexer to receive the actual active thread state of the thread; and
 the virtual thread state structure coupled with the virtual state reload multiplexer, the virtual thread state structure having a virtual thread state register to generate and store a virtual active thread state based on the actual active thread state, wherein the virtual thread state structure is further to forward the actual active thread state to the state update logic, and the virtual thread state structure to continuously reload the virtual active thread state within the critical update loop until another actual active thread is detected.

2. The processor of claim 1, wherein the virtual state mechanism is further to form the critical update loop to implement a single cycle critical update loop in a multi-threaded processor by eliminating a number of gates and delays associated with the number of gates.

3. The processor of claim 2, wherein the processor includes the multithreaded processor having the plurality of threads.

4. A system comprising:
 a processor including a multi-threaded processor having a plurality of threads, the processor coupled with a storage medium via a bus, the processor having a virtual state mechanism to form a critical update loop that does not include state update logic, the critical update loop being formed each time an actual active thread state of a thread of the plurality of threads is detected, the critical update loop being formed between a virtual state reload multiplexer and a virtual thread state structure;
 the virtual state mechanism including the virtual state reload multiplexer to receive the actual active thread state of the thread; and
 the virtual thread state structure coupled with the virtual state reload multiplexer, the virtual thread state structure having a virtual thread state register to generate and store a virtual active thread state based on the actual active thread state, wherein the virtual thread state structure is further to forward the actual active thread state to the state update logic, and the virtual thread state structure to continuously reload the virtual active thread state within the critical update loop until another actual active thread is detected.

5. The system of claim 4, wherein the virtual state mechanism is further to form the critical update loop to implement a single cycle critical update loop in a multi-threaded processor by eliminating a number of gates and delays associated with the number of gates.

6. A method comprising:
 forming, via a virtual state mechanism at a processor, a critical update loop that does not include state update logic, the critical update loop being formed each time an actual active thread state of a thread of a plurality of threads is detected, the critical update loop being formed between a virtual state reload multiplexer and a virtual thread state structure, the processor including a multi-threaded processor having the plurality of threads, wherein forming includes:
 receiving, via the virtual state reload multiplexer, the actual active thread state of the thread;
 generating, via a virtual thread state register of the virtual thread state structure coupled with the virtual state reload multiplexer, a virtual active thread state based on the actual active thread state, the virtual active thread state being stored at the virtual thread state register;

forwarding, via the virtual state structure, the actual active thread state to the state update logic; and continuously reloading, via the virtual thread state structure, the virtual active thread state within the critical update loop until another actual active thread is detected.

7. The method of claim 6, wherein forming the critical update loop includes implementing a single cycle critical update loop in a multi-threaded processor by eliminating a number of gates and delays associated with the number of gates.

8. A machine-readable storage medium comprising instructions that when executed, cause a machine to:

form, via a virtual state mechanism at a processor, a critical update loop that does not include state update logic, the critical update loop being formed each time an actual active thread state of a thread of a plurality of threads is detected, the critical update loop being formed between a virtual state reload multiplexer and a virtual thread state structure, the processor including a multi-threaded processor having the plurality of threads, wherein forming causes the machine to:

receive, via the virtual state reload multiplexer, the actual active thread state of the thread; and generate, via a virtual thread state register of the a virtual thread state structure coupled with the virtual state reload multiplexer, virtual active thread state based on the actual active thread state, the virtual active thread state being stored at the virtual thread state register;

forward, via the virtual state structure, the actual active thread state to the state update logic; and continuously reload, via the virtual thread state structure, the virtual active thread state within the critical update loop until another actual active thread is detected.

9. The machine-readable storage medium of claim 8, wherein the instructions when executed to form the critical update loop, further cause the machine to implement a single cycle critical update loop in a multi-threaded processor by eliminating a number of gates and delays associated with the number of gates.

* * * * *

UNITED STATES PATENT AND TRADEMARK OFFICE
CERTIFICATE OF CORRECTION

PATENT NO. : 7,653,904 B2  Page 1 of 1
APPLICATION NO. : 10/672150
DATED : January 26, 2010
INVENTOR(S) : Nicholas G. Samra It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1614 days.

Signed and Sealed this

Twenty-eighth Day of December, 2010

David J. Kappos
*Director of the United States Patent and Trademark Office*